United States Patent
Nagoh et al.

[11] Patent Number: 5,304,477
[45] Date of Patent: Apr. 19, 1994

[54] PROCESS FOR PRODUCING HARD FATS USING 1,3-SPECIFIC LIPASE AND MIXTURE OF PALMITIC, LAURIC AND BEHEMIC ACIDS

[75] Inventors: Atsushi Nagoh, Kaizuka; Masaaki Miyabe, Sennan; Yoshitaka Ebihara, Sakai, all of Japan

[73] Assignee: Fuji Oil Company, Limited, Osaka, Japan

[21] Appl. No.: 907,850

[22] Filed: Jul. 2, 1992

[30] Foreign Application Priority Data

Jul. 8, 1991 [JP] Japan .................................. 3-194857

[51] Int. Cl.$^5$ .......................... C12P 7/64; C12N 9/20; C12N 1/14
[52] U.S. Cl. .................................. 435/134; 435/198; 435/254.3; 435/254.8; 435/254.9
[58] Field of Search .................... 435/134, 198, 254.9, 435/254.3, 254.8

[56] References Cited

U.S. PATENT DOCUMENTS

| | | | |
|---|---|---|---|
| 3,949,105 | 4/1976 | Wieske et al. | 426/607 |
| 4,735,900 | 4/1988 | Urata et al. | 435/134 |
| 4,940,845 | 7/1990 | Hirota et al. | 435/134 |

FOREIGN PATENT DOCUMENTS

| | | |
|---|---|---|
| 0151450 | 1/1985 | European Pat. Off. . |
| 0170431 | 4/1985 | European Pat. Off. . |
| 0427309 | 10/1990 | European Pat. Off. . |
| 2205850 | 12/1988 | United Kingdom . |
| 2119397 | 11/1993 | United Kingdom . |

OTHER PUBLICATIONS

Patent Abstracts of Japan vol. 6, No. 154 *C-119)(1032) Aug. 14, 1982 & JP-A-57 074 041 (Asahi Denka Kogyo K.K.) May 10, 1982.
Patent Abstracts of Japan vol. 7, No. 191 *C-14 182)(1336) Aug. 20, 1983 & JP-A-58 094 345 (Kao Sekken K.K.) Jun. 4, 1983.
Haraldsson and Almarsson Acta Chem Scand (45) 1991 Studies on the Positional Specificity . . . , pp. 723-730.

*Primary Examiner*—David M. Naff
*Assistant Examiner*—Michael V. Meller
*Attorney, Agent, or Firm*—Wenderoth, Lind & Ponack

[57] ABSTRACT

A process for producing hard fats is disclosed. The process involves reacting a 1,3-specific lipase with a mixture of 23–48% palmitic acid, 6–25% lauric acid and 0.5–5% behenic acid or its ester with a monohydric or polyhydric alcohol. The palmitic acids include: palm oil, fractionated palm oil and hardened palm oil. The lauric acids include: palm kernel oil, coconut oil, babassu oil and fractioned oil and hardened oil obtained from the palm kernel, coconut or babassu oil. The lipase is preferably obtained from Rhizopus, Aspergillus, Mucor, pancreas and rice bran.

4 Claims, No Drawings

PROCESS FOR PRODUCING HARD FATS USING 1,3-SPECIFIC LIPASE AND MIXTURE OF PALMITIC, LAURIC AND BEHEMIC ACIDS

FIELD OF THE INVENTION

The present invention relates to a process for producing hard stocks which are useful as a raw material of plastic fat products such as margarine and shortening.

BACKGROUND OF THE INVENTION

Most of the plastic fat products such as margarine and shortening are produced from hard stocks and liquid oils as raw materials. As an example of such a production, liquid oils such as soybean oil, corn oil, and rapeseed oil, are blended with their hardened oils (hard stocks), and the blend is adjusted to have an appropriate consistency (plasticity). The plastic fat products such as margarine and shortening thus produced tend to cause the formation of relatively coarse crystallines because fats and oils used as the raw materials are composed of fatty acids having almost the same carbon chain length, in other words, they have a highly-unified composition of fatty acids. For this reason, the plasticity of the products can be maintained at an appropriate degree only within a narrow temperature range, so that the liquid oils contained therein have a tendency to exude.

As a process for producing other hard stocks useful as a raw material of plastic fat products such as margarine and shortening, there is a well-known process using palm type oils, in which palm type oils and lauric type oils are subjected to random interesterification with a metallic catalyst such as sodium methylate (see, e.g., the specification of U.S. Pat. No. 3,949,105). According to this process, the fundamental symmetric structure of palm type oils can be modified into a random structure, and it is, therefore, possible to improve the properties of plastic fat products which will become unfavorable because the palm type oils may be gradually hardened with time when the products are being stored. However, an increase in the amount of undesirable tri-saturated triglycerides makes an inevitable rise in the melting point, and various characteristics as a plastic fat material are deteriorated by the formation of coarse crystallines; accordingly, the products may have poor characteristics of melting in a mouth. For this reason, fractionation or hardening is required after the interesterification.

If the interesterification is conducted with a lipase (see the specification of EP 0,170,431), which has, in particular, a selectivity for the 1- and 3-positions of triglycerides, it is possible to inhibit an increase in the amount of tri-saturated triglycerides. According to this process, however, palm type oils remain having the fundamental symmetric structure, i.e., having a tendency to crystallize in the β-form, so that a sufficient improvement in the crystallizability as a hard stock material for use in margarine and shortening cannot be attained. This makes a problem that when they are used as a raw material of plastic food the plasticity of the food will be deteriorated during the storage.

OBJECTS OF THE INVENTION

Under these circumstances, in order to solve the above problems, the present inventors have intensively studied a process for producing hard stocks with excellent characteristics by use of palm type oils which are abundant and inexpensive. As a result, they have found that both the above deficiency of conventional random interesterification and the difficulty of interesterification with a lipase can be solved by conducting interesterification which has a specificity for the 1- and 3- positions of triglycerides in the presence of behenic acid residues as well as lauric type oils. That is, they have found that it is possible to prevent the exudation of liquid oils contained in the products with a temperature increase, to inhibit a rise in the melting point caused by an increase in the amount of tri-saturated triglycerides, and to solve the problem that the products may be hardened with time during the long-term storage, thereby completing the present invention.

Thus, the main object of the present invention is to provide a process for producing hard stocks with excellent characteristics for use as a raw material of plastic fat products, based on the interesterification with a lipase which is allowed to act on a mixture of palm type oils, lauric type oils, and behenic acid or esters thereof.

This object as well as other objects and advantages of the present invention will become apparent to those skilled in the art from the following description.

SUMMARY OF THE INVENTION

According to the present invention, there is provided a process for producing hard stocks comprising the steps of allowing a lipase to act on a mixture of palm type oils, lauric type oils, and behenic acid or esters thereof for interesterification.

The mixture subject to interesterification in a preferred embodiment has a fatty acid composition of 6–25% lauric acid, 23–48% palmitic acid, and 0.5–5% behenic acid.

The palm type oils used in a preferred embodiment are selected from the group consisting of palm oil, fractioned oils and hardened oils thereof.

The lauric type oils used in a preferred embodiment are selected from the group consisting of palm kernel oil, coconut oil, babassu oil, fractioned oils and hardened oils thereof.

The lipase used in a preferred embodiment is selected from the group consisting of lipases derived from the genus Rhizopus, Aspergillus or Mucor, pancreatic lipase, and rice bran lipase.

DETAILED DESCRIPTION OF THE INVENTION

The palm type oils used in the present invention are those having a palmitic acid content of 30% or more, examples of which are palm oil per se, fractioned oils and hardened oils thereof. The lauric type oils used in the present invention are those having a lauric acid content of 30% or more, examples of which are palm kernel oil, coconut oil, babassu oil, fractioned oils and hardened oils thereof. The behenic acid is in the form of a free fatty acid, and esters thereof are those formed from behenic acid with a monohydric or polyhydric alcohol, for example, in the form of a fatty acid ester of alcohols such as methanol, ethanol, ethylene glycol, and glycerol.

In addition to the above palm type oils and lauric type oils, any other oil may be used as a starting oil for interesterification. It is, however, preferred that a mixture of these starting oils for interesterification is adjusted to have a fatty acid composition of 6–25% lauric acid, 23–48% palmitic acid, and 0.5–5% behenic acid. Such a fatty acid composition makes it possible to provide hard stocks useful as a raw material of plastic fat products; the hard stocks have a melting point of from 30° C. to 45° C., high malleability and high ductility, as well as excellent properties of preventing the exudation of liquid oils within a temperature range of from room temperature to a temperature slightly higher than room temperature. Moreover, they can preferably prevent, when used as a hard stock material of plastic fat products, the deterioration of plasticity.

In particular, to achieve an efficient production of hard stocks having excellent properties of melting in a mouth, without using the step of fractionation or hardening after the interesterification, for example, the following blend of raw materials with a fatty acid composition as described above can be employed: 13-50% palm oil or stearin fractions obtained by fractionation thereof as a palm type oil, 48-85% palm kernel oil, coconut oil, babassu oil, or olein fractions obtained by fractionation thereof as a lauric type oil, and 2-10% hardened oils having a behenic acid content of 20% or more as a behenic acid component.

The process of the present invention is based on the interesterification of a mixture comprising palm type oils, lauric type oils, and behenic acid or esters thereof with a lipase. Therefore, the carbon chain length in the constitute fatty acids of mixed fatty acid triglycerides formed may widely vary, and even if there remains the structure having oleic acid at the respective 2nd positions of the palm type oils at a relatively high proportion, the resulting hard stocks have excellent advantages of inhibiting the formation of coarse crystallines with time, having good crystallizability as a plastic fat, and exhibiting satisfactory plasticity when used in a product such as margarine.

The lipase used for interesterification preferably has a specificity for the 1- and 3-positions of triglycerides because the formation of undesirable trisaturated triglycerides is reduced and the carbon chain length in the constitute fatty acids as described above widely varies, so that excellent physical properties can be retained even after a long-term storage. Examples of the lipase with a specificity for the 1- and 3-positions of triglycerides are those derived from the genus Rhizopus, Aspergillus or Mucor, pancreatic lipase, and rice bran lipase. Although these lipases can be used in a free form for the interesterification, it is usually preferred that they are used in an immobilized form by adsorbing on a support such as diatomaceous earth, alumina, or active carbon.

Also, lipases in the form of a dried enzyme preferably prepared as disclosed in the specifications of U.S. Pat. No. 4,472,503 and U.S. Pat. No. 4,873,194 have an activity even in the absence of water, and the use of such a dried enzyme can make it possible to reduce the formation of by-products from any side reaction, such as diglycerides, in the reaction system. The interesterification is conducted in a batch or continuous process with or without any solvent at a temperature of from 20° C. to 70° C.

The following examples further illustrate the present invention in detail but are not to be construed to limit the scope thereof. Unless otherwise indicated, parts and percentages (%) are all by weight.

EXAMPLE 1 AND COMPARATIVE EXAMPLES 1–3

At a proportion shown in Table 1 below, palm stearin, palm oil, palm kernel olein, and extremely hardened high-erucic rapeseed oil were mixed together, and the mixture was subjected to interesterification with a lipase having a specificity for the 1- and 3-positions of triglycerides, resulting in a hard stock (Example 1).

For comparison, prepared were an interesterified fat obtained without blending extremely hardened high-erucic rapeseed oil (Comparative Example 1), a blend oil having the same composition as that of Example 1 and obtained without any interesterification (Comparative Example 2), and hardened soybean oil (Comparative Example 3). The analytical data on the fatty acid composition of these hard stocks and the physical properties are also shown in Table 1.

Then, 50 parts of each of the above hard stocks were blended with 50 parts of purified soybean oil, and 80 parts of this blend were further blended with an aqueous phase comprising water, powdered skim milk, and common salt to produce margarine by a conventional process. The margarine was stored at 5° C. or 25° C., and the physical properties were evaluated. The results are shown in Table 2. A change in the hardness with time was determined from measurements with a rheometer (manufactured by Fudo Kogyo Co., Ltd.) using 10 mm$\phi$ plunger at a table-rise rate of 5 cm/min.

TABLE 1

| Preparation method | Example 1 Interesterification | Comparative Example 1 Interesterification | Comparative Example 2 Blending | Comparative Example 3 Hardening |
|---|---|---|---|---|
| Raw materials (parts) | | | | |
| Hardened soybean oil | — | — | — | 100 |
| Palm stearin | 34 | 35 | 34 | — |
| Palm oil | 24 | 25 | 24 | — |
| Palm kernel olein | 39 | 40 | 39 | — |
| Extremely hardened high-erucic rapeseed oil | 3 | — | 3 | — |
| Fatty acid content (%) | | | | |
| Lauric acid | 15.6 | 16.0 | 15.6 | 0 |
| Palmitic acid | 32.1 | 33.2 | 32.1 | 10.2 |
| Behenic acid | 1.5 | 0 | 1.5 | 0 |
| Physical properties | | | | |
| Iodine value | 35.2 | 36.3 | 35.3 | 75.8 |
| Melting point (°C.) (softening point) | 34.1 | 34.5 | 46.0 | 34.0 |
| Solid fat index (%) | | | | |
| at 5° C. | 35.9 | 36.7 | 37.1 | 34.2 |
| at 10° C. | 30.4 | 29.8 | 29.7 | 31.9 |
| at 15° C. | 25.4 | 23.8 | 25.3 | 28.2 |
| at 20° C. | 23.1 | 20.3 | 24.2 | 23.9 |
| at 25° C. | 16.6 | 14.2 | 23.2 | 16.8 |
| at 30° C. | 9.5 | 8.1 | 21.2 | 7.3 |
| at 35° C. | 3.7 | 3.9 | 19.4 | 1.6 |
| at 40° C. | 0.2 | 0.5 | 15.8 | 0.0 |
| at 45° C. | 0.0 | 0.0 | 10.0 | 0.0 |
| at 50° C. | 0.0 | 0.0 | 0.5 | 0.0 |

TABLE 2

|  | Example 1 | Comparative Example 1 | Comparative Example 2 | Comparative Example 3 |
|---|---|---|---|---|
| Separation of liquid oils (25° C.)* | | | | |

TABLE 2-continued

|  | Example 1 | Comparative Example 1 | Comparative Example 2 | Comparative Example 3 |
|---|---|---|---|---|
| after 3 days | − | − | − | + |
| after 7 days | − | −+ | − | + |
| Change in hardness with time (5° C.) | | | | |
| after 10 days | 400 | 500 | 630 | 360 |
| after 30 days | 420 | 950 | 1200 | 400 |
| after 90 days | 480 | 1500 | 1860 | 430 |
| evaluation | small | large | large | small |
| Malleability and ductility (after storage at 5° C.) | good | good | poor | good |

*Criteria of evaluation:
−, no separation; −+, slight separation; +−, moderate separation; and +, signifi- As seen from the results in Table 2, the margarine using hardened soybean oil (Comparative Example 3) caused the separation of liquid oils at 25° C.; the margarine using an interesterified oil of the palm/lauric type (Comparative Example 1) also caused the separation of liquid oils in some degree and exhibited a significantly large change in the hardness with time, thereby causing the deterioration of plasticity. Although the use of behenic acid residues in part of the raw materials prevented the separation of liquid oils, the blend oil prepared without any interesterification (Comparative Example 2) exhibited inferior characteristics of melting in a mouth, poor malleability and poor ductility, as well as a significantly large change in the hardness with time, thereby causing the deterioration of plasticity.

In contrast, the hard stock prepared using behenic acid residues by interesterification (Example 1) provided the margarine which did not cause the separation of liquid oils and exhibited only a quite small change in the hardness. This fact indicates that all the above disadvantages of Comparative Examples 1–3 were solved by a combination of the use of behenic acid residues with interesterification.

EXAMPLES 2–5 AND COMPARATIVE EXAMPLES 4–6

Various kinds of margarine were produced in the same manner as described in Example 1, except that the raw materials shown in Table 3 were used and interesterification was conducted in all cases. In Example 5 where ethyl behenate was used in place of extremely hardened high-erucic rapeseed oil, there was a need to remove ethyl ester fractions by distillation after the interesterification.

TABLE 3

| Preparation method | Example 2 Interesterification | Example 3 Interesterification | Example 4 Interesterification | Example 5 Interesterification | Comparative Example 4 Interesterification | Comparative Example 5 Interesterification | Comparative Example 6 Interesterification |
|---|---|---|---|---|---|---|---|
| Raw materials (parts) | | | | | | | |
| Palm stearin | 5 | 5 | 7 | 4.5 | 10 | | |
| Palm oil | 78 | 48 | 55 | 79 | 78 | 43 | 55 |
| Palm kernel oil | | 45 | | | | 55 | |
| Palm kernel olein | 15 | | 30 | 15 | 10 | | 30 |
| Extremely hardened high-erucic rapeseed oil | 2 | 2 | 8 | | 2 | 2 | 15 |
| Ethyl behenate | | | | 1.5 | | | |
| Fatty acid content (%) | | | | | | | |
| Lauric acid | 6.2 | 21.6 | 12.3 | 6.2 | 4.1 | 26.4 | 12.3 |
| Palmitic acid | 38.5 | 27.6 | 30.5 | 41.7 | 40.8 | 18.9 | 24.2 |
| Behenic acid | 1.0 | 1.0 | 4.0 | 1.5 | 1.0 | 1.0 | 7.5 |
| Physical properties | | | | | | | |
| Iodine value | 47.0 | 34.7 | 36.3 | 46.5 | 48.4 | 31.7 | 31.0 |
| Melting point (°C.) (softening point) | 34.1 | 34.8 | 42.3 | 34.5 | 34.0 | 34.4 | 42.1 |

TABLE 4

|  | Example 2 | Example 3 | Example 4 | Example 5 | Comparative Example 4 | Comparative Example 5 | Comparative Example 6 |
|---|---|---|---|---|---|---|---|
| Separation of liquid oils (25° C.)* | | | | | | | |
| after 3 days | − | − | − | − | − | − | − |
| after 7 days | − | − | − | − | −+ | −+ | − |
| Change in hardness with time (5° C.) | small | small | small | small | large | large | small |
| Malleability and ductility (after storage at 5° C.) | good | good | good | good | poor | poor | good |
| Characteristics of melting in a mouth | good | good | good | good | poor | good | poor |

*Criteria of evaluation:
−, no separation; −+, slight separation; +−, moderate separation; and +, significant separation.

cant separation.

As seen from the results in Table 4, when the lauric acid content was smaller that 6% (Comparative Example 4), malleability and ductility became poor; characteristics of melting in a mouth was deteriorated; physical properties significantly changed with time; and slight separation of liquid oils was caused. On the other hand, when the lauric acid content was greater than 25% (Comparative Example 5), satisfactory characteristics of melting in a mouth were attained, whereas other physical properties were deteriorated. These facts indicate that lauric acid contents outside the range of from 6% to 25% produce only a small effect of long-chain fatty acids.

The margarine produced from the hard stock with a behenic acid content of greater than 5% (Comparative Example 6) also had inferior characteristics of melting in a mouth.

As described hereinabove, hard stocks obtained by the process of the present invention are particularly useful as a raw material of plastic fat products such as margarine and shortening because they have the excellent advantages of inhibiting the separation of liquid oils, having satisfactory characteristics of melting in a mouth, and preventing the deterioration of plasticity with time.

We claim:

1. A process for producing hard fats comprising reacting a 1,3-specific with a mixture of
   an oil having a palmitic acid content of at least 30%,
   an oil having a lauric acid content of at least 30%, and
   free behenic acid or its ester with a monohydric or polyhydric alcohol, said mixture having a fatty acid composition of 6–25% lauric acid, 23–48% palmitic acid and 0.5–5% behenic acid, based on the weight of the mixture to produce said hard fat and recovering the hard fat.

2. A process according to claim 1, wherein said oil containing palmitic acid is selected from the group consisting of palm oil, fractioned palm oil and hardened palm oil.

3. A process according to claim 1, wherein said oil containing lauric acid is selected from the group consisting of palm kernel oil, coconut oil, babassu oil, and fractioned oil and hardened oil obtained from said palm kernel, coconut or babassu oil.

4. A process according to claim 1, wherein said lipase is obtained from a microorganism of the genus Rhizopus, Aspergillus or Mucor, or said lipase is a pancreatic lipase or rice bran lipase.

* * * * *